United States Patent
Drueke et al.

(10) Patent No.: US 9,983,615 B2
(45) Date of Patent: May 29, 2018

(54) MARINA POWER PEDESTAL SPLITTER CORD AND ELECTRICAL DISTRIBUTION SYSTEM INCLUDING THE SAME

(71) Applicant: EATON CORPORATION, Cleveland, OH (US)

(72) Inventors: Chris Emmons Drueke, Williamsburg, VA (US); Jeffery Scott Kuykendall, Williamsburg, VA (US); Paul David Seff, Williamsburg, VA (US); Jason Demetrios Easton, Williamsburg, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 305 days.

(21) Appl. No.: 15/019,159

(22) Filed: Feb. 9, 2016

(65) Prior Publication Data

US 2017/0227979 A1    Aug. 10, 2017

(51) Int. Cl.
*H02H 3/00*     (2006.01)
*G05F 5/00*     (2006.01)
*H02B 1/50*     (2006.01)
*H02H 7/22*     (2006.01)

(52) U.S. Cl.
CPC .......... *G05F 5/00* (2013.01); *H02B 1/50* (2013.01); *H02H 7/228* (2013.01)

(58) Field of Classification Search
CPC .......................................... G05F 5/00
See application file for complete search history.

(56) References Cited

U.S. PATENT DOCUMENTS

| 6,844,716 | B1 |   | 1/2005  | Lundberg et al. |               |
|-----------|----|---|---------|-----------------|---------------|
| 7,855,337 | B2 | * | 12/2010 | Scherer         | H02B 1/50     |
|           |    |   |         |                 | 174/2         |
| 8,605,395 | B1 | * | 12/2013 | Hoyenski, III   | H02H 11/005   |
|           |    |   |         |                 | 361/42        |
| 9,281,644 | B2 | * | 3/2016  | Myong           | H01R 25/003   |

* cited by examiner

*Primary Examiner* — Stephen W Jackson
(74) *Attorney, Agent, or Firm* — Eckert Seamans

(57) ABSTRACT

A splitter cord for use with a power pedestal including a plurality of receptacles, the splitter cord includes a plurality of branch circuits each having a first end including a connector structured to electrically connect to one of the plurality of receptacles, a second end electrically connected to a common node, and a current regulator electrically connected between the first and second ends and being structured to control current flowing through said branch circuit such that current exiting said one receptacle is substantially equal to current entering said one receptacle, and a stem circuit having a first end including a connector structured to electrically connect to a device or vehicle receptacle and a second end electrically connected to the common node. A sum of currents flowing through the plurality of branch circuits is equal to current flowing through the stem circuit.

20 Claims, 5 Drawing Sheets

MARINA POWER PEDESTAL SPLITTER CORD AND ELECTRICAL DISTRIBUTION SYSTEM INCLUDING THE SAME

BACKGROUND

Field of the Invention

The disclosed concept pertains generally to splitter cords for power pedestals and, more particularly, to splitter cords for marina power pedestals. The disclosed concept also pertains to electrical distribution systems including splitter cords.

Background Information

U.S. Pat. No. 6,844,716 discloses a utility distribution pedestal for marine and recreational vehicles. Known power pedestals include receptacles that can be used in conjunction with power cords to provide power to the marine or recreational vehicles. Each receptacle has an associated rating (e.g., without limitation, 125V, 30 A; 125/250V, 50 A) and current above the rating of the receptacle cannot safely be supplied from one receptacle.

In some applications, the marine or recreational vehicle may need to draw current above the rating of one receptacle. Splitter cords have been used to address this issue. A splitter cord includes one end that has two or more connectors for connecting to receptacles of the power pedestal and another end that has one connector for connecting to the marine or recreational vehicle. Thus, the power provided to the marine or recreational vehicle is divided among multiple receptacles of the power pedestal. As such, the marine or recreational vehicle is able to draw current above the rating of just one of the receptacles.

However, prior splitter cords are not compatible with all power pedestals. Many power pedestals include ground fault circuit interrupters (GFCIs). Prior splitter cords often interfere with the proper operation of the GFCIs and can cause nuisance tripping. Safety codes now require GFCIs to be included in many types of power pedestals, so prior splitter cords will interfere with operations of many types of modern power pedestals.

There is room for improvement in splitter cords for power pedestals.

SUMMARY

These needs and others are met by embodiments of the disclosed concept wherein a splitter cord regulates current to control the amount of current exiting one receptacle to equal the amount of current entering the receptacle.

In accordance with one aspect of the disclosed concept, a splitter cord for use with a power pedestal including a plurality of receptacles comprises: a plurality of branch circuits each having a first end including a connector structured to electrically connect to one of the plurality of receptacles, a second end electrically connected to a common node, and a current regulator electrically connected between the first and second ends and being structured to control current flowing through said branch circuit such that current exiting said one receptacle is substantially equal to current entering said one receptacle; and a stem circuit having a first end including a connector structured to electrically connect to a device or vehicle receptacle and a second end electrically connected to the common node, wherein a sum of currents flowing through the plurality of branch circuits is equal to current flowing through the stem circuit.

In accordance with another aspect of the disclosed concept, an electrical distribution system comprises: a power pedestal including a plurality of receptacles; and a splitter cord comprising: a plurality of branch circuits each having a first end including a connector structured to electrically connect to one of the plurality of receptacles, a second end electrically connected to a common node, and a current regulator electrically connected between the first and second ends and being structured to control current flowing through said branch circuit such that current exiting said one receptacle is substantially equal to current returning to said one receptacle; and a stem circuit having a first end including a connector structured to electrically connect to a device or vehicle receptacle and a second end electrically connected to the common node, wherein a sum of currents flowing through the plurality of branch circuits is equal to current flowing through the stem circuit.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "vehicle" shall expressly include, but not be limited by, a land vehicle, a marine vehicle, an air vehicle or another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, construction vehicles, off road vehicles, all-terrain vehicles, farm vehicles, fleet vehicles, motor homes, vans, buses, motorcycles, mopeds, campers, trailers, or bicycles.

As employed herein, the term "marine vehicle" shall expressly include, but not be limited by, any water-based vehicles, ships, boats, other vessels for travel on water, submarines, or other vessels for travel under water.

As employed herein, the term "air vehicle" shall expressly include, but not be limited by, any air-based vehicles, airplanes, jets, aircraft, airships, balloons, blimps, or dirigibles.

As employed herein, the term "number" shall mean one or an integer greater than one (i.e., a plurality).

As employed herein, the term "platform" shall mean a horizontal flat surface, a raised horizontal flat surface, or a dock pier.

As employed herein, the term "pedestal" or "pedestal member" shall mean an elongated, generally upright structure.

As employed herein, the term "power pedestal" shall mean a pedestal or pedestal member structured to input power from input power terminals (e.g., utility power terminals) and output power to a number of output power receptacles.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a marina power pedestal, although the disclosed concept is applicable to a wide range of vehicle power pedestals.

Figure 1:
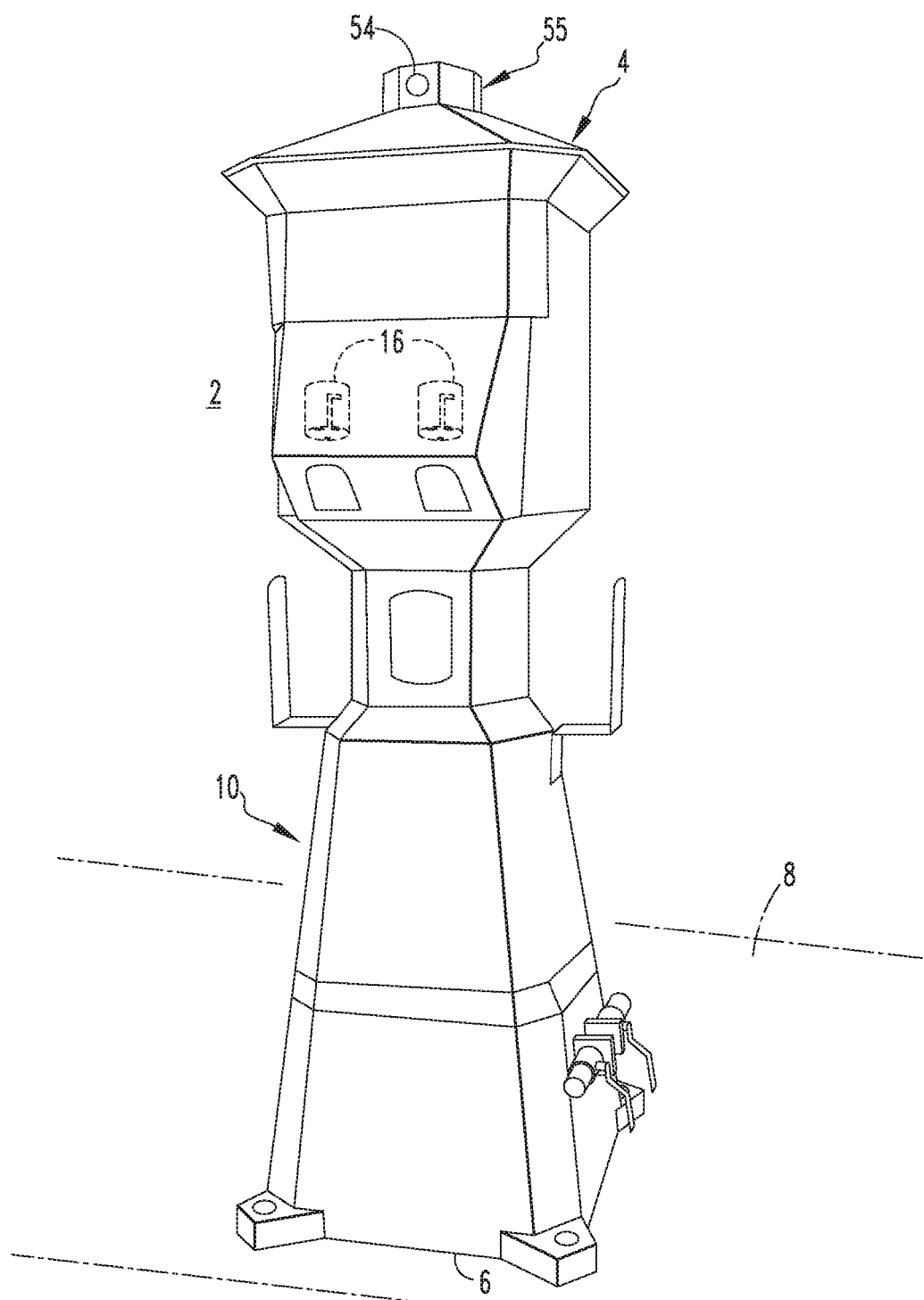
FIG. 1 is an isometric view of a marina power pedestal in accordance with embodiments of the disclosed concept.
Figure 2:
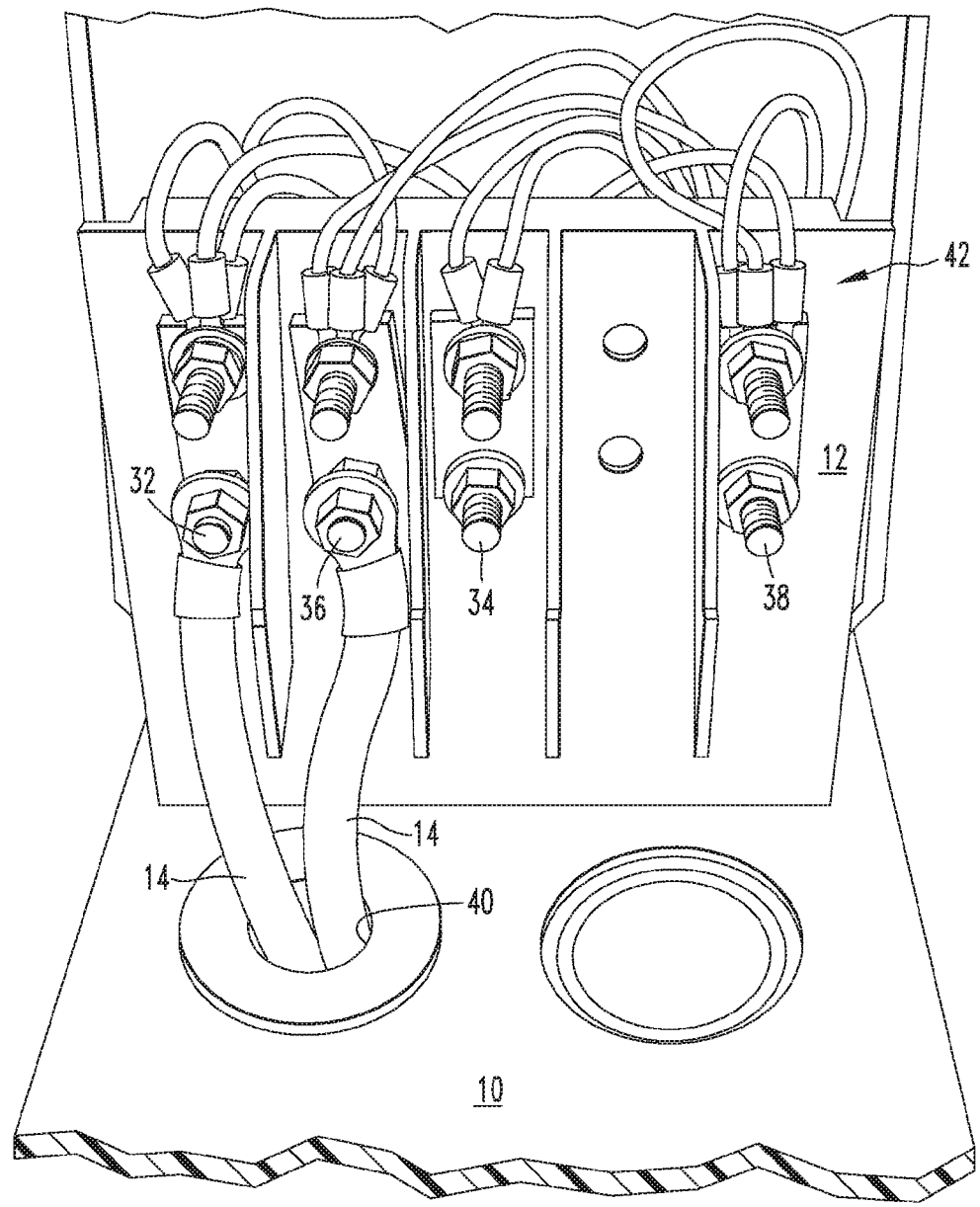
FIG. 2 is an isometric view of the input power terminals of the marina power pedestal of FIG. 1.

Referring to FIGS. 1 and 2, a power pedestal, such as, for example and without limitation, a marina power pedestal 2 includes a pedestal member 4 having a base 6 structured to be mounted or fixed to a mounting member, such as, for example and without limitation, a platform. In the example shown, the platform is a dock pier 8 (shown in phantom line drawing) and an enclosure 10 extending generally vertically from the base 6. A plurality of input power terminals 12 (shown in FIG. 2) are mounted to the pedestal member 4 and are structured to be electrically connected to a power source (e.g., a utility power source) (not shown) by plural electrical conductors 14 (shown in FIG. 2). The marina power pedestal 2 also includes a number of output power receptacles 16 mounted to the enclosure 10. In some example embodiments of the disclosed concept, the marina power pedestal 2 further includes a number of circuit interrupters, such as, for example and without limitation, ground fault circuit interrupters (GFCIs) 18 (shown in FIG. 3) or other types of circuit breakers.

The marina power pedestal 2 is structured to provide electrical power to vehicles or devices that are electrically connected to the marina power pedestal 2 via the output power receptacles 16. In some example embodiments of the disclosed concept, the output power receptacles 16 each have an associated rating such as, without limitation, 30 A, 50 A, etc.

The power pedestal 2 further includes an indicator 54. The indicator 54 is structured to provide an indication to a person outside the enclosure 10 of the power pedestal 2. In some example embodiments of the disclosed concept, the indication is a visual indication and the indicator 54 may be a light source such as, for example and without limitation, a light emitting diode (LED). In further example embodiments of the disclosed concept, the indicator 54 can provide different color indications and may be a multi-color light source such as, without limitation, a multi-color LED. The indicator 54 may also include multiple light sources such as, without limitation, multiple LEDs of different colors.

Referring to FIG. 2, the input power terminals 12 of the marina power pedestal 2 of FIG. 1 are shown. These terminals 12 include a first line terminal 32 (LINE1), a second line terminal 34 (LINE2), a neutral terminal 36 and a ground terminal 38. As shown by the two example electrical conductors 14, the terminals 32,34,36,38 are structured to be electrically connected to a suitable power source (not shown) by those conductors 14, which extend through the opening 40. It will be appreciated that the other terminals 34,38 may also be electrically connected to the power source by other electrical conductors (not shown). Additional electrical conductors 42 electrically connect the terminals 32,34, 36,38 to other components such as, without limitation, the output power receptacles 16 or the GFCIs 18.

Figure 3:
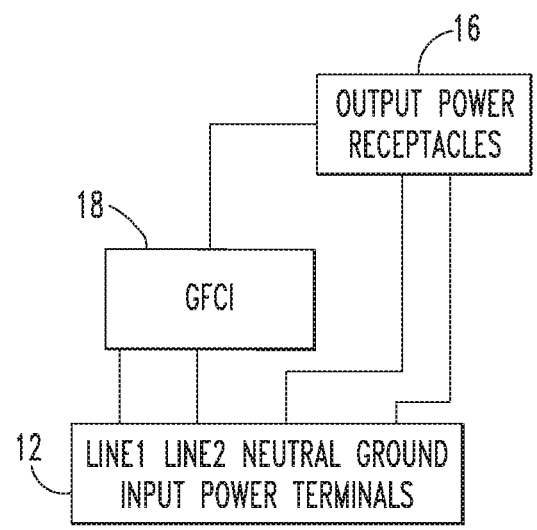
FIG. 3 is a schematic diagram of a ground fault protection circuit in accordance with embodiments of the disclosed concept.

Referring to FIG. 3 a schematic diagram of a ground fault protection circuit is shown. The ground fault protection circuit includes the input power terminals 12, the output power receptacles 16 and the GFCIs 18. In example embodiments of the disclosed concept where the marina power pedestal 2 does not provide ground fault protection, the GFCIs 18 are omitted. In some example embodiments of the disclosed concept, the GFCIs 18 may be replaced with circuit breakers without ground fault protection.

As previously described, the input power terminals 12 are mounted to the pedestal member 4 and are structured to be electrically connected to a power source (e.g., a utility power source) (not shown). The input power terminals 12 are electrically connected to the output power receptacles 16. In more detail, NEUTRAL and GROUND electrical connections of the input power terminals 12 are electrically connected to the output power receptacles 16 and LINE1 and LINE2 electrical connections of the input power terminals 12 are electrically connected to the output power receptacles 16 via the GFCIs 18. The GFCIs 18 have the capability of detecting a ground fault on the power circuit. When one of the GFCIs 18 detects a ground fault, it trips open, electrically disconnecting the corresponding output power receptacle from LINE1 or LINE2.

Figure 4:
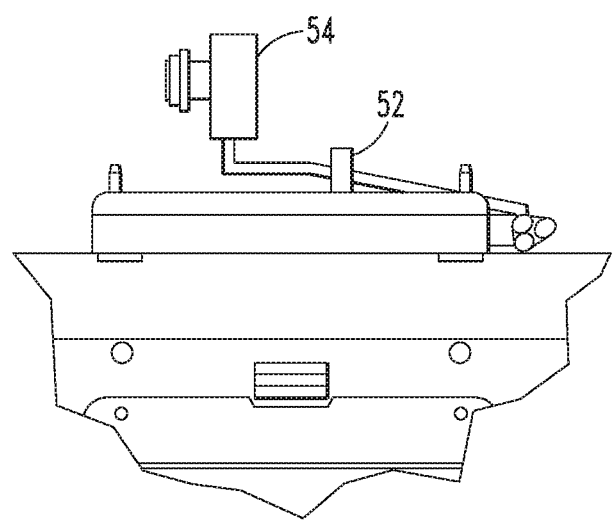
FIG. 4 is a view of an indicator in accordance with example embodiments of the disclosed concept.

FIG. 4 is an enlarged view of a portion of an upper housing 55 (shown in FIG. 1) of the power pedestal 2 in accordance with an example embodiment of the disclosed concept, shown with the cover removed to illustrate internal components that would otherwise be enclosed and thus hidden. In the example embodiment of FIG. 4, the indicator 54 is a light source such as, without limitation, an LED. FIG. 4 shows the area inside the power pedestal 2 where the indicator 54 is located. Since the indicator 54 is located in a top portion of the power pedestal 2, it is easy to see when it is illuminated. Also, the upper housing 55 of the power pedestal 2 includes transparent or translucent exterior panels so that light from the indicator 52 can be seen from outside the power pedestal 2.

In some example embodiments of the disclosed concept, the power pedestal 2 further includes a photocell 54. The photocell 54 provides ambient light detection which can be used to turn off lights on the power pedestal 2 when it is light outside in order to save power.

Figure 5:
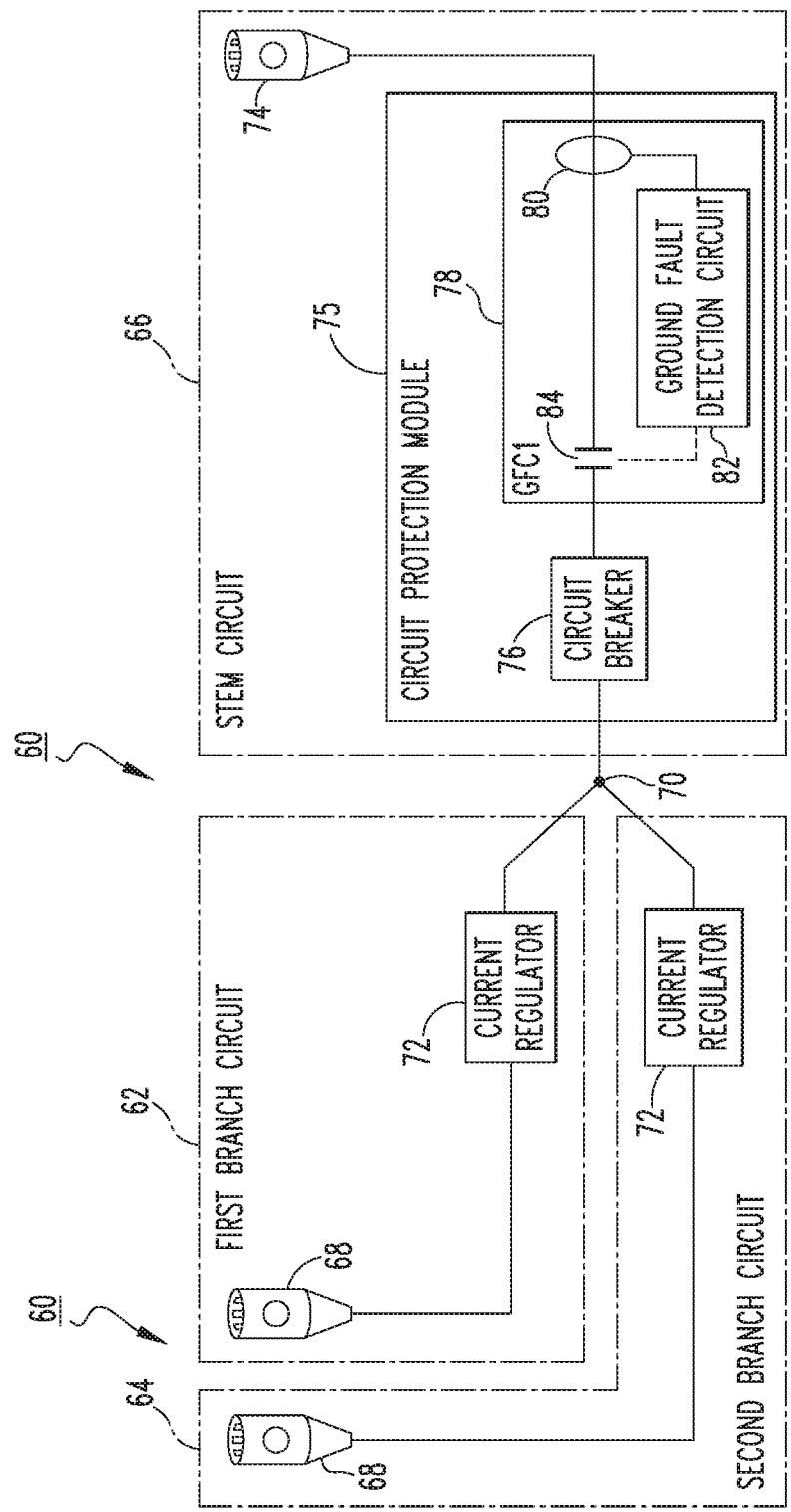
FIG. 5 is a schematic diagram of a splitter cord for use with a power pedestal in accordance with embodiments of the disclosed concept.
Figure 6:
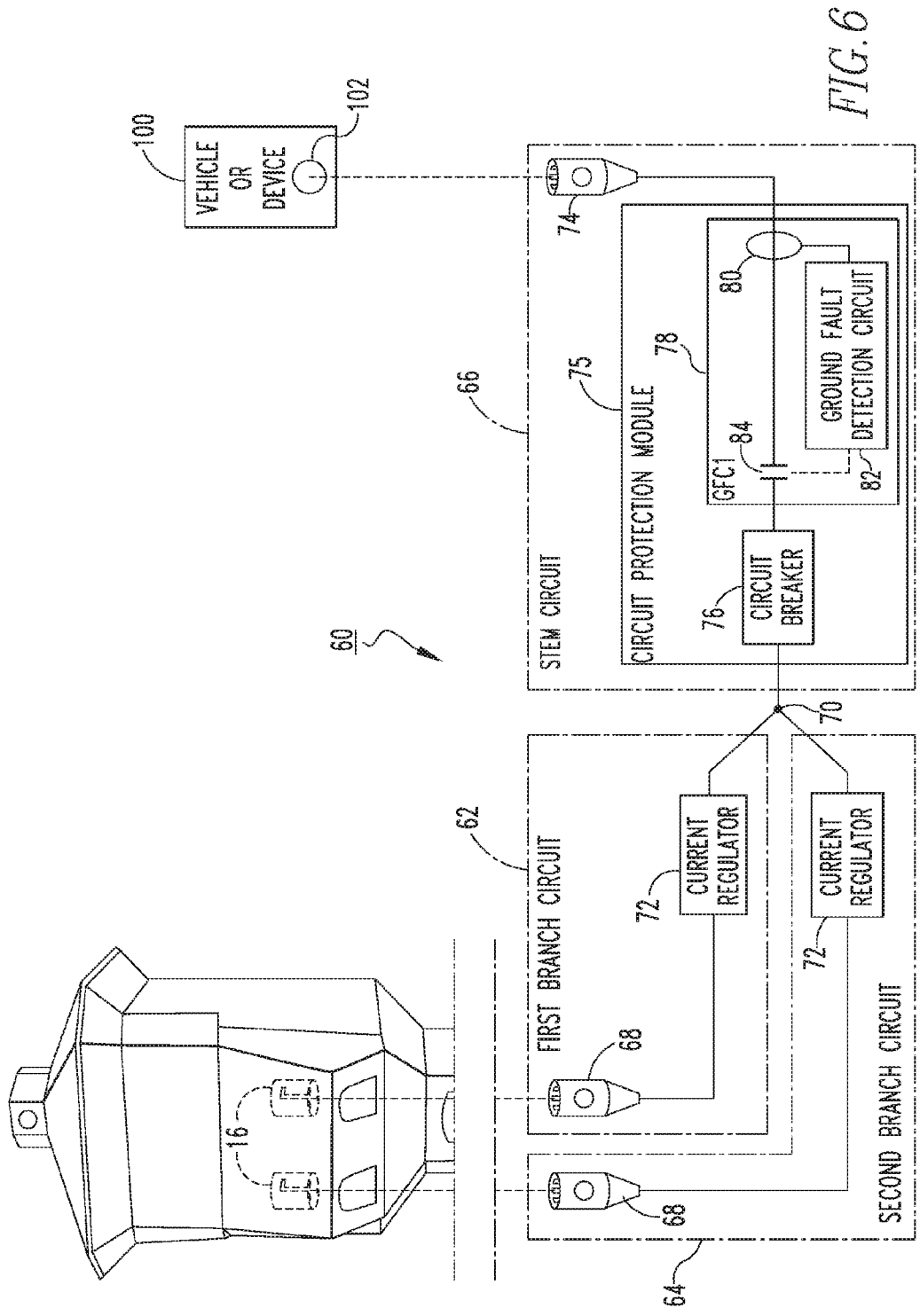
FIG. 6 is a schematic diagram of an electrical distribution system including a power pedestal and a splitter cord in accordance with embodiments of the disclosed concept.

Referring to FIG. 5, a schematic diagram of a splitter cord 60 in accordance with an example embodiment of the disclosed concept is shown, and, referring to FIG. 6, an electrical power distribution system 90 employing the splitter cord 60 and the marina power pedestal 2 in accordance with an example embodiment of the disclosed concept is shown. Although the splitter cord 60 is described herein in conjunction with the marina power pedestal 2, it will be appreciated by those having ordinary skill in the art that the splitter cord 60 may be employed with various different types of power pedestals without departing from the scope of the disclosed concept. The splitter cord 60 allows a vehicle or device 100 to simultaneously draw power from multiple output power receptacles 16.

The splitter cord 60 includes a first branch circuit 62, a second branch circuit 64 and a stem circuit 66. The first and second branch circuits 62,64 each have one end including a connector 68 structured to electrically connect to one of the output power receptacles 16. The first and second branch circuits 62,64 also each have a second end electrically connected to a common node 70. The first and second branch circuit 62,64 each further include a current regulator 72 electrically connected between the first and second ends of the respective branch circuit 62,64.

The current regulators 72 are structured to regulate current flowing in each of the first and second branch circuits 62,64 such that current exiting the output power receptacle 16 into one of the branch circuit 62,64 is substantially equal to current entering the output power receptacle 16 from the same one of the branch circuits 62,64. That is, if a current of 5 A is flowing out of one of the output power receptacles 16 into the first branch circuit 62, the current regulator 72 will regulate the current to ensure that a current of 5 A will also flow back into the same output power receptacle 16 from the first branch circuit 62. In some example embodiments of the disclosed concept, the current regulators 72 are circuits formed from any suitable circuit components (e.g., without limitation, integrated circuit chips, resistors, capacitors, inductors, etc.).

The splitter cord 60 further includes a stem circuit 66. The stem circuit 66 has one end that includes a connector 74 structured to electrically connect to a vehicle or device receptacle 102 included on the vehicle or device 100. The vehicle or device 100 may be any vehicle such as a marine vehicle, a land vehicle or an air vehicle suited to receive power from the marina power pedestal 2 or other type of power pedestal or any other device suited to receive power from the marina power pedestal 2 or any other type of power pedestal. The stem circuit 66 further includes a second end electrically connected to the common node 70. In some example embodiments of the disclosed concept, the stem circuit further includes a circuit protection module 75 including a circuit breaker 76 and/or a GFCI 78 to provide fault protection for the splitter cord 60.

The circuit protection module 75 may include the circuit breaker 76, the GFCI 78, or both of the circuit breaker 76 and the GFCI 78 without departing from the scope of the disclosed concept. In some example embodiments of the disclosed concept, the circuit protection module 75 is omitted from the splitter cord 60. The circuit breaker 76 may be any suitable type of circuit breaker such as, without limitation, a thermal/magnetic type circuit breaker. In some example embodiments of the disclosed the circuit breaker 76 is rated at 50 A, such as when the output power receptacles 16 are each rated at 30 A. In some other example embodiments of the disclosed concept, the circuit breaker 76 is rated at 100 A, such as when the output power receptacles 16 are each rated at 50 A.

The GFCI 78 is structured to provide ground fault protection from the splitter cord 60. Providing ground fault protection from the splitter cord 60 is particularly useful when the marina power pedestal 2, or any other power pedestal the splitter cord 60 is used with does not provide ground fault protection. In some example embodiments of the disclosed concept, the GFCI 78 includes a ground fault current sensor 80, a ground fault detection circuit 82 and separable contacts 84. The ground fault current sensor 80 is structured to sense current flowing through the stem circuit 66 and the ground fault detection circuit 82 is structured to detect whether a ground fault is present based on the sensed current. In some example embodiments of the disclosed concept, the ground fault current sensor 80 is a zero-sequence ground fault current transformer. The ground fault detection circuit 82 is also structured to output a signal to control the separable contacts 84 to open when a ground fault is detected.

In some example embodiments of the disclosed concept, each of the branch circuits 62,64 and the stem circuit 66 include line, neutral and ground conductors such as are typically found in electrical power cords. At the common node 70, like conductors of the branch circuits 62,64 and the stem circuit 66 are electrically connected together. That is, the line conductors of the branch circuits 62,64 are electrically connected to the line conductor of the stem circuit 66, the neutral conductors of the branch circuits 62,64 are electrically connected to the neutral conductor of the stem circuit 66, and the ground conductors of the branch circuits 62,64 are electrically connected to the ground conductor of the stem circuit 66. Connection of the branch circuits 62,64 and stem circuit 66 at the common node 70 allows a sum of currents flowing through the branch circuits 62,64 to be equal to current flowing through the stem circuit 66.

The splitter cord 60 allows the vehicle or device 100 to draw current from both output power receptacles 16 simultaneously. This allows the vehicle or device 100 to draw current in excess of the rating of one of the output power receptacles 16. For example and without limitation, if the output power receptacles 16 each have a rating of 30 A and the vehicle or device receptacle 102 has a rating of 50 A, the vehicle or device 100 can safely draw a current of 50 A from the output power receptacles 16 by drawing a current of about 25 A from each output power receptacle 16. Similarly, when the output power receptacles 16 each have a rating of 50 A and the vehicle or device receptacle 102 has a rating of 100 A, the vehicle or device 100 can safely draw a current of 100 A from the output power receptacles 16.

Ground faults are generally detected based on an imbalance of current exiting and entering a receptacle, as the imbalance is generally an indication of leakage in a circuit due to a ground fault. In prior splitter cords, current exiting a receptacle into one branch circuit can end up entering another receptacle through another branch since there is nothing to control whether current returns to the branch it originated from. A GFCI in a power pedestal will interpret the imbalance of current entering and exiting the receptacle as a ground fault even though a true ground fault is not present. By using current regulators 72 in the splitter cord 60 in accordance with example embodiments of the disclosed concept, the current exiting and entering each of the output power receptacles 16 is controlled to be equal so any GFCIs 18 included in the marina power pedestal 2 will not erroneously detect ground faults. Further, by providing the GFCI 78 in the splitter cord 60, the splitter cord 60 can provide ground fault protection even if the marina power pedestal 2 does not provide ground fault protection. Moreover, the GFCI 78 in the splitter cord 60 can detect any ground faults that may be hidden from detection by GFCIs 18 in the marina power pedestal 2 due to current regulation by the splitter cord 60.

Although two output power receptacles 16 and two branch circuits 62,64 are disclosed in example embodiments of the disclosed concept, it will be appreciated by those having ordinary skill in the art that greater numbers of branch circuits 62,64 in the splitter cord 60 and greater numbers of output power receptacles 16 in the marina power pedestal 2 may be employed without departing from the scope of the disclosed concept.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A splitter cord for use with a power pedestal including a plurality of receptacles, the splitter cord comprising:
    a plurality of branch circuits each having a first end including a connector structured to electrically connect to one of the plurality of receptacles, a second end electrically connected to a common node, and a current regulator electrically connected between the first and second ends and being structured to control current flowing through said branch circuit such that current exiting said one receptacle is substantially equal to current entering said one receptacle; and
    a stem circuit having a first end including a connector structured to electrically connect to a device or vehicle receptacle and a second end electrically connected to the common node,
    wherein a sum of currents flowing through the plurality of branch circuits is equal to current flowing through the stem circuit.

2. The splitter cord of claim 1, wherein the stem circuit includes a circuit protection module structured to provide fault protection.

3. The splitter cord of claim 2, wherein the circuit protection module includes a ground fault circuit interrupter structured to provide ground fault protection.

4. The splitter cord of claim 3, wherein the ground fault circuit interrupter includes a ground fault current sensor structured to sense current flowing through the stem circuit, a ground fault detection circuit structured to detect whether a ground fault is present based on the sensed current, and separable contacts structured to open, wherein the ground fault detection circuit is structured to output a signal to control the separable contacts to open when a ground fault is detected.

5. The splitter cord of claim 4, wherein the ground fault current sensor is a zero-sequence ground fault current transformer.

6. The splitter cord of claim 2, wherein the circuit protection module includes a thermal/magnetic type circuit breaker.

7. The splitter cord of claim 6, wherein the circuit breaker has a 50 A or 100 A rating.

8. The splitter cord of claim 2, wherein the circuit protection module includes a ground fault circuit interrupter structured to provide ground fault protection and a thermal/magnetic type circuit breaker.

9. The splitter cord of claim 1, wherein the plurality of receptacles have a 30 A or 50 A rating and the device or vehicle receptacle has a 50 A or 100 A rating.

10. The splitter cord of claim 1, wherein a number of the branch circuits is two.

11. The splitter cord of claim 1, wherein the power pedestal includes a ground fault circuit interrupter structured to provide ground fault protection.

12. The splitter cord of claim 1, wherein each of the branch circuits includes a line conductor, a neutral conductor and a ground conductor; wherein the stem circuit includes a line conductor, a neutral conductor and a ground conductor; and wherein the line conductor, the neutral conductor and the ground conductor of each of the branch circuit is are respectively electrically connected to the line conductor, the neutral conductor and the ground conductor of the stem circuit.

13. An electrical distribution system comprising:
    a power pedestal including a plurality of receptacles; and
    a splitter cord comprising:
        a plurality of branch circuits each having a first end including a connector structured to electrically connect to one of the plurality of receptacles, a second end electrically connected to a common node, and a current regulator electrically connected between the first and second ends and being structured to control current flowing through said branch circuit such that current exiting said one receptacle is substantially equal to current returning to said one receptacle; and
        a stem circuit having a first end including a connector structured to electrically connect to a device or vehicle receptacle and a second end electrically connected to the common node,
        wherein a sum of currents flowing through the plurality of branch circuits is equal to current flowing through the stem circuit.

14. The electrical distribution system of claim 13, wherein the stem circuit includes a circuit protection module structured to provide fault protection.

15. The electrical distribution system of claim 14, wherein the circuit protection module includes a ground fault circuit interrupter structured to provide ground fault protection.

16. The electrical distribution system of claim 14, wherein the circuit protection module includes a thermal/magnetic type circuit breaker.

17. The electrical distribution system of claim 14, wherein the circuit protection module includes a ground fault circuit interrupter structured to provide ground fault protection and a thermal/magnetic type circuit breaker.

18. The electrical distribution system of claim 13, wherein a number of the branch circuits is two.

19. The electrical distribution system of claim 13, wherein the power pedestal includes a ground fault circuit interrupter structured to provide ground fault protection.

20. The electrical distribution system of claim 13, wherein each of the branch circuits includes a line conductor, a neutral conductor and a ground conductor; wherein the stem circuit includes a line conductor, a neutral conductor and a ground conductor; and wherein the line conductor, the neutral conductor and the ground conductor of each of the branch circuit is are respectively electrically connected to the line conductor, the neutral conductor and the ground conductor of the stem circuit.

* * * * *